United States Patent Office 3,574,819
Patented Apr. 13, 1971

3,574,819
PHARMACEUTICAL COMPOSITIONS FOR TREATING DIGESTIVE DISORDERS CONTAINING 4,7-PHENANTHROLIN - 5,6 - QUINONE TOGETHER WITH PANCREATIN, BROMELIN, DEHYDROCHOLIC ACID AND 7 - IODO - 5 - CHLORO-8-HYDROXYQUINOLINE
Franz Gross, Bottmingen, Switzerland, and Christian Bittner, Wehr, Baden, and Rudolf Reipert, Schworstadt, Germany, Guenther Mueller, Arlesheim, Switzerland, and Kurt Bauer, Opladen-Quettingen, Germany, assignors to Ciba Corporation, New York, N.Y.
No Drawing. Filed Dec. 4, 1967, Ser. No. 687,432
Claims priority, application Switzerland, Dec. 8, 1966, 17,502/66
Int. Cl. A61k 9/00
U.S. Cl. 424—21                                    4 Claims

ABSTRACT OF THE DISCLOSURE

New pharmaceutical preparations for oral administration containing as active ingredients 4,7-phenanthroline-5,6-quinone, pancreatin, bromelin, dehydrocholic acid and 7-iodo-5-chloro-8-hydroxyquinoline, and a method of treating digestive disorders consisting in administrating such pharmaceutical compositions.

---

The present invention provides a new pharmaceutical preparation for treating digestive disorders, as well as a method of treating such disorders.

The new preparation may be given orally and is characterized in that it contains 4,7-phenanthrolin-5,6-quinone together with pancreatin, bromelin, dehydrocholic acid and 7-iodo-5-chloro-8-hydroxyquinoline and a pharmaceutical excipient suitable for oral administration.

Pancreatin is a mixture of animal amylase, trypsin, chymotrypsin and lipase.

Bromelin is a mixture of different plant proteases isolated from the juice, the fruit and the stalks of pineapples.

The new preparation is particularly suitable for treating (a) disorders and digestive complaints associated with excretory disorders of the pancreas, chronic atrophic gastritis, stomach resections, cholecystectomy, cholecystopathy, chronic hepatopathy, diminished mastication ability in advanced age, also meteorism, flatulence and repletion sensations,
(b) diarrhoeas associated with
 unspecified intestinal infections
 accelerated gastro-intestinal passage
 disturbed gastric flora due to administration of antibiotics bacterial and parasitary intestinal infections
(c) dyspepsias associated with abnormal putrfaction and fermentation
(d) constipations of various etiologies
(e) gastro-cardial symptom complex (Roemheld).

The new preparation advantageously contains the above-mentioned active substances in such an amount that for every 10 mg. of 4,7-phenanthrolin-5,6-quinone about 80 to 120 mg. of iodo-chlorohydroxyquinoline, about 20 to 30 mg. of dehydrocholic acid, about 40 to 60 mg. of bromelin and about 120 to 180 mg. of pancreatin are present in it. Particularly good results are obtained with preparations that contain per 10 mg. of 4,7-phenanthrolin-5,6-quinone 100 mg. of iodo-chlorohydroxyquinoline, 25 mg. of dehydrocholic acid, 50 mg. of bromelin and 150 mg. of pancreatin.

Advantageously, the dosing unit is so selected that it contains 10 mg. of 4,7-phenanthrolin-5,6-quinone. The daily dose is advantageously so chosen that the patient ingests 20 to 80 mg., preferably 30 to 60 mg., of 4,7-phenanthrolin-5,6-quinone. It is advantageous to give this daily dose in small portions; thus, for example, 3 doses each containing 10 or 20 mg. of 4,7-phenanthrolin-5,6-quinone may be given daily.

The new preparation is advantageously made up in a form suitable for oral administration containing per dosing unit 10 mg. of 4,7-phenanthrolin-5,6-quinone in conjunction or admixture with other active substances above all at the weight ratio mentioned above, especially with 100 mg. of iodo-chlorohydroxyquinoline, 25 mg. of dehydrocholic acid, 50 mg. of bromelin and 150 mg. of pancreatin. In this case three times one or two of these dosing units are given daily.

For the oral preparation there are suitable as excipient or coating material, for example, sugar, magnesium stearate, higher fatty acids, bolus alba, cellulose powder, starches, polyalkyleneglycols and their esters with higher fatty acids, gelatin, gums, cholesterol or other auxiliaries.

A preferred form of the new preparation is the dragée.

It has further been observed that particularly good therapeutic results are achieved with the new preparation when it takes the form of a special three-stage dragée which, therefore, is a special object of this invention. This three-stage dragée contains bromelin in the dragée layer that dissolves in the gastric fluid, whereas the inside core contains 4,7 - phenanthrolin-5,6-quinone and iodo-chlorohydroxyquinoline and, isolated therefrom in an enveloping core layer, pancreatin and the dehydrocholic acid. The whole of this composite core is enveloped by a substance that resists the gastric fluid and decomposes in an alkaline medium.

This arangement ensures at first optimal protein digestion in the stomach owing to the liberation of bromelin with its proteolytic activity.

After passage through the stomach, in the alkaline medium of the duodenum, the protective envelope is dissolved, advantageously within 4 to 6 minutes, whereby first pancreatin and the dehydrocholic acid is liberated. The fermenative activity of pancreatin substantially promotes the digestion of the fats, proteins and carbohydrates. In this way the protein digestion is improved not only directly but also indirectly through the stimulation of the pancreas secretion caused by the resulting protein degradation products, the peptones and aminoacids. Dehydrocholic acid promotes the resorption of fats and fat-soluble vitamins, emulsifies the nutritional fats and thereby improves the activity of the lipases and has a choleretic affecting the physiological intestinal flora. Dysbiose in testines.

Finally, in the upper small intestine the 4,7-phenanthrolin-5,6-quinone and the iodo-chlorohydroxyquinoline are liberated and disperse in the small intestine. These active substances together possess an excellent effect towards pathogenic bacteria, fungi and amoeba without adversely affecting the physiological intestinal flora. Dysbiose in the intestine is counteracted and the eubiose restored. In this connection the synergistic activity of pancreatin with the two active substances mentioned against abnormal putrifaction and fermentation processes in the small intestine is of special value.

3

Advantageously, the three-stage dragée described above comprises an envelope round the core formed from the so-called core granulate with the 4,7-phenanthrolin-5,6-quinone and the iodo-chlorohydroxyquinoline and from the so-called shell granulate with the pancreatin and the dehydrocholic acid, these granulates being pressed to form a shell tablet domed in dragée fashion; this shell tablet is then coated with a lacquer that is stable towards the gastric fluid and then coated with a dragée coating which contains the bromelin and is soluble in the gastric fluid. Finally, the dragée is sugar coated.

The new pharmaceutical preparation is formulated by the methods conventionally employed in pharmacy, for example by combining the active compounds with a suitable carrier material.

The following examples illustrate the invention without in any way limiting its scope thereto.

EXAMPLE 1

A dragée is prepared from the following ingredients:

| | Mg. |
|---|---|
| Active substances: | |
| Pancreatin | 150.0 |
| Iodo-chlorohydroxyquinoline | 100.0 |
| Bromelin | 50.0 |
| Dehydrocholic acid | 25.0 |
| 4,7-phenanthrolin-5,6-quinone | 10.0 |
| Auxiliaries: | |
| Sugar | 153.8 |
| Bolus alba | 63.2 |
| Talcum | 57.25 |
| Cellulose powder | 20.0 |
| Cellulose acetate phthalate | 16.0 |
| Wheat starch | 10.50 |
| Arrowroot | 10.0 |
| Maize starch | 10.0 |
| Stearic acid | 6.0 |
| Cysteine hydrochloride | 5.0 |
| Aerosil compositum | 5.0 |
| Kollidon 25 | 4.13 |
| Diethylphthalate | 4.0 |
| Aerosil, pure | 3.39 |
| Titanium dioxide | 3.39 |
| Gelatina alba | 3.0 |
| Polyethyleneglycol-4000-monostearate | 2.26 |
| Sodium laurylsulphate | 2.05 |
| Yellow alimentary lacquer | 1.13 |
| Magnesium stearate | 1.0 |
| Vanillin | 0.056 |
| Carnauba wax | 0.05 |
| | 716.206 |

EXAMPLE 2

A 3-stage dragée is manufactured in the following manner:

First step

Shell tablets domed in dragée fashion are manufactured on a special tabletting machine from a core granulate and a shell granulate, which contain in the core 10 mg. of 4.7-phenanthrolin-5,6-quinone and 100 mg. of iodo-chlorohydroxyquinoline, and in the shell 25 mg. of dehydrocholic acid and 150 mg. of pancreatin as active ingredients. The two granulates are composed as follows:

CORE GRANULATE

| | Mg. per core |
|---|---|
| 4,7-phenanthrolin-5,6-quinone | 10.0 |
| Iodo-chlorohydroxyquinoline | 100.0 |
| Wheat starch | 15.0 |
| Gelatin | 3.0 |
| Arrowroot | 11.0 |
| Stearic acid | 6.0 |
| Talcum | 5.0 |
| | 150.0 |

SHELL GRANULATE

| | Mg. per shell |
|---|---|
| Pancreatin | 150.0 |
| Dehydrocholic acid | 25.0 |
| Cellulose powder | 30.0 |
| Cellulose ether | 2.5 |
| Talcum | 3.0 |
| Arrowroot | 51.5 |
| Aerosil | 1.5 |
| Magnesium stearate | 1.5 |
| | 265.0 |

The core granulate is granulated in the usual manner with water and then dried.

The pancreating granulate is likewise granulated in principle in the usual manner, but this must be done cautiously to ensure that during the granulation operation the ferment content does not drop.

Second step

The shell tablets domed in dragée fashion, having a mean gross weight of 415 mg. each, are coated in the usual manner with a cellulose acetate/phthalate lacquer resistant to the gastric juices.

Third step

The cores provided with the lacquer coating resistant to the gastric juices are enveloped with a dragée-making suspension that is free from, or contains only little, water; this suspension contains the proteolytic ferment bromelin as active ingredient. With this suspension a sufficient number of coats but no more is applied to the cores to ensure for each dragée core a mean content of 50 mg. of bromelin.

COMPOSITIONS OF THE DRAGEE-MAKING SUSPENSIONS

Containing little water

| | Percent |
|---|---|
| Bromelin | 9.0 |
| Polyvinylpyrrolidone | 0.3 |
| Cellulose ether | 3.0 |
| Sugar syrup | 4.5 |
| Talcum | 3.0 |
| Chloroform | 28.4 |
| Methanol | 11.8 |
| Methylenechloride | 40.0 |

Containing no water

| | |
|---|---|
| Bromelin | 10.0 |
| Cellulose ether | 5.0 |
| Talcum | 7.5 |
| Methanol | 7.5 |
| Methylenechloride | 70.0 |

After having been coated with the bromelin layer the dragées are carefully dried.

Fourth step

Finally, the dragées are coated with sugar which is applied in the usual manner in the form of sugar syrup or a dragée-making suspension.

We claim:

1. A pharmaceutical preparation in which the inside core of a three-stage dragée contains 4,7-phenthroline-5,6-quinone and 7-iodo-5-chloro-8-hydroxyquinoline, the enveloping core layer contains pancreatin and dehydrocholic acid, and the outer dragée layer contains bromelin, the dragée substance being so chosen that it dissolves in the gastric juice, while the whole of the composite core is enveloped by a substance that resists the gastric fluid and decomposes in an alkaline medium, so that the enveloping core layer is liberated in the alkaline medium of the duodenum only, the inner core decaying in the upper part of the small intestine, said preparation containing for every 10 mg. of 4,7-phenanthrolin-5,6-quinone about 80 to 120 mg. of 7 - iodo - 5 - chloro - 8 - hydroxyquinoline, about 20 to 30 mg. of dehydrocholic acid, about 40 to 60 mg. of bromelin and about 120 to 180 mg. of pancreatin.

2. A pharmaceutical preparation according to claim 1, containing for every 10 mg. of 4,7-phanenthrolin-5,6-quinone, 100 mg. of 7-iodo-5-chloro-8-hydroxyquinoline, 25 mg. of dehydrocholic acid, 50 mg. of bromelin and 150 mg. of pancreatin.

3. A pharmaceutical preparation according to claim 1, containing 10 mg. of 4,7-phenanthrolin-5,6-quinone per dosage unit.

4. A pharmaceutical preparation according to claim 2, containing 10 mg. of 4,7-phenanthrolin-5,6-quinone per dosage unit.

References Cited
UNITED STATES PATENTS 3,004,893  10/1961  Martin _____ 424—94

ALBERT T. MEYERS, Primary Examiner

D. M. STEPHENS, Assistant Examiner

U.S. Cl. X.R.

424—16, 94, 258